O. HANSEN.
BEET ELEVATOR.
APPLICATION FILED NOV. 24, 1919.
1,416,196.
Patented May 16, 1922.
2 SHEETS—SHEET 2.
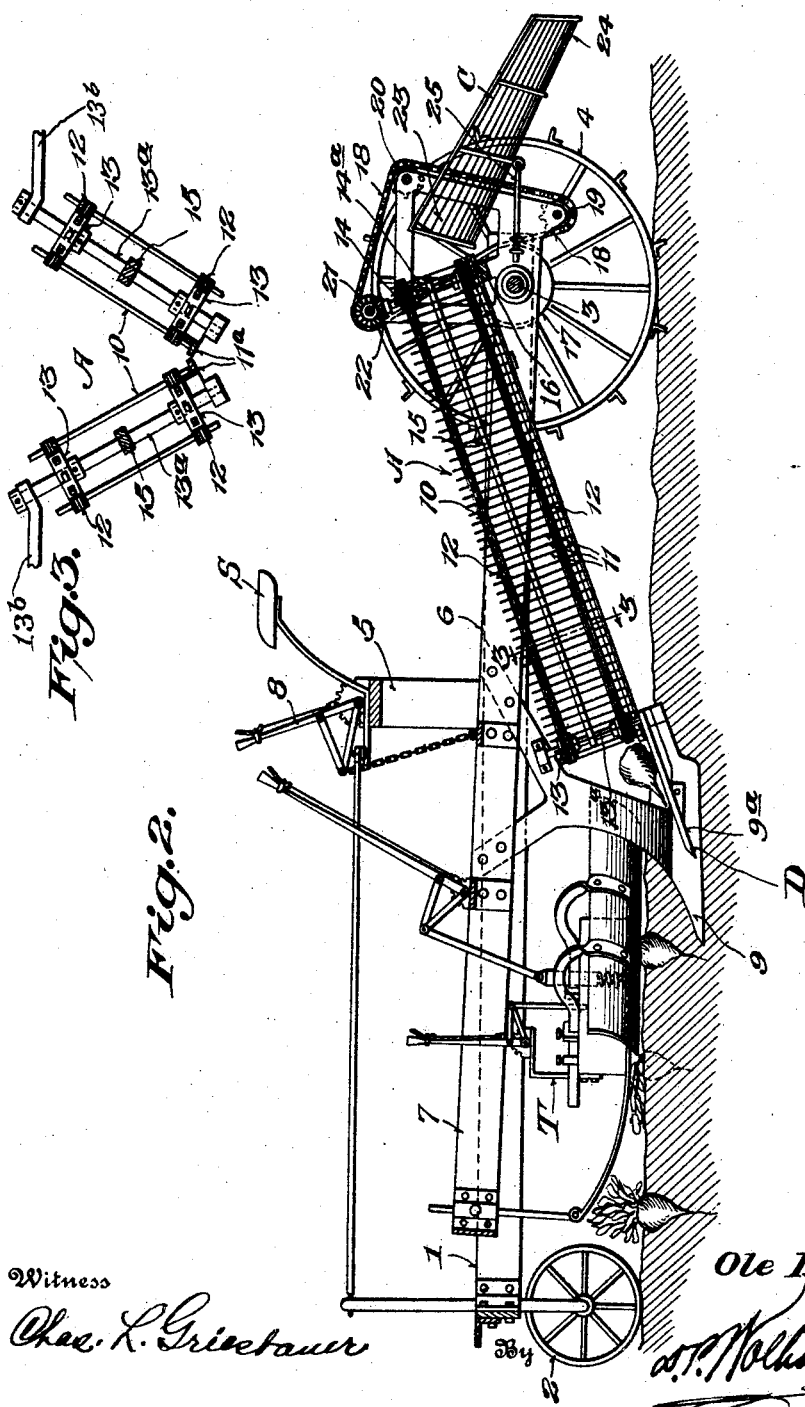
Inventor
Ole Hansen,

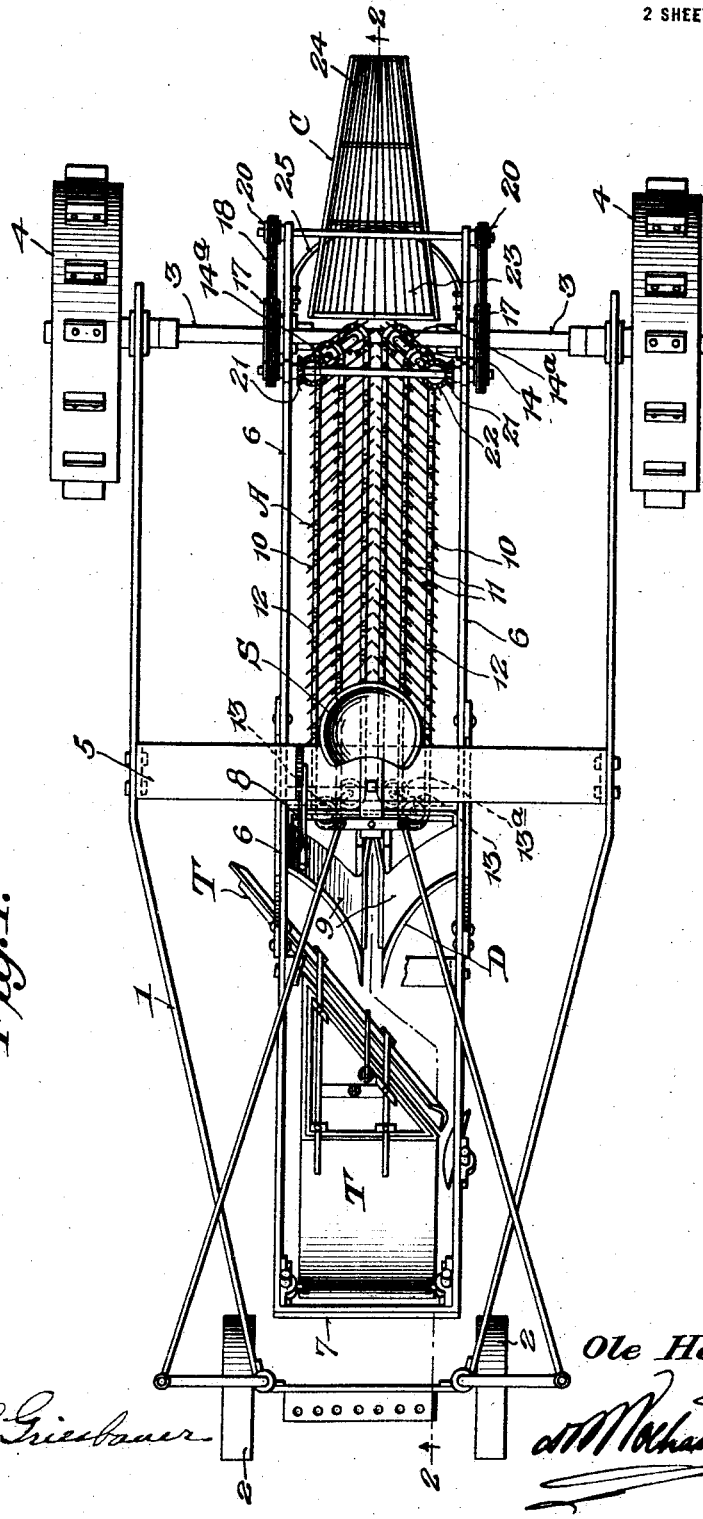

UNITED STATES PATENT OFFICE.

OLE HANSEN, OF MENAN, IDAHO.

BEET ELEVATOR.

1,416,196.

Specification of Letters Patent.  Patented May 16, 1922.

Application filed November 24, 1919. Serial No. 340,257.

*To all whom it may concern:*

Be it known that I, OLE HANSEN, citizen of the United States, residing at Menan, in the county of Jefferson and State of Idaho, have invented certain new and useful Improvements in Beet Elevators, of which the following is a specification.

This invention relates to beet harvesters and has particular reference to a novel beet elevator for transferring the beets from the digging instrumentalities to a point where they may be conveniently handled or collected.

To this end the invention contemplates an elevating device which not only removes the beets in a thoroughly practical and expeditious manner from the plow shares of the digging unit but at the same time serves to separate earth and waste parts from the beets themselves. In this connection it is proposed to provide a novel device which is automatically operated by the movement of the vehicle, whereby the relative speed of the vehicle will be proportionate to the speed of the feed to thereby successfully handle the beets lifted from the ground by the digging unit without danger of clogging or choking which would be apt to cause the meat of the beets to be bruised and rendered less desirable for market purposes.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which:

Figure 1 is a top plan view of a machine embodying the novel elevating device.

Figure 2 is a longitudinal section on the line 2—2 of Figure 1.

Figure 3 is a vertical sectional view on the line 3—3 of Figure 2.

Similar reference characters designate corresponding parts throughout the several figures of the drawings.

In carrying the present invention into effect it is proposed to utilize a frame 1 which is preferably of open formation as shown in Figure 1 of the drawings, and provided at its front end with the steering wheels 2, while at the rear end thereof is an axle shaft 3 having the traction wheels 4 mounted thereon. The frame 1 is therefore mounted to travel over the terrain to be worked and has mounted at its forward end a novel topping device designated generally as T, and preferably of the type shown in my former Patent No. 1,319,069 dated October 21, 1919. This topping device is provided with means for depressing and severing the tops of the beets from the beet roots before they are removed from the ground, and, like my former construction, is capable of being adjustably manipulated by the operator from the seat S carried by the arched frame member 5 on the main frame 1.

The open formation of the main frame 1 conveniently provides for the reception of the present novel elevating unit designated generally as A and carried upon an inside frame 6 arranged within the main frame 1 and pivotally supported on the axle shaft 3 independently of the said main frame. By reason of this particular mounting of the inner frame 6 it will be apparent that the forward end 7 thereof may be raised and lowered through the operator's connection 8 to bring the digging unit D carried by the front end thereof into and out of engagement with the ground, and also regulate the proper depth at which the plow shares 9 thereof work in the beet hills. The plows 9 of the digging unit D are preferably of a type having the elevating fins or guides 9$^a$ which serve to progressively lift or raise the beets from the ground after they have been loosened by the leading edges or points of the plow shares. That is to say, the earth engaging portions of the plows 9 are preferably provided with suitable beet elevating guide rails which lead directly to the elevating device A, whereby as the beets are removed from the ground and pushed upwardly between the guides 9$^a$, they will be engaged by the feeding or conveyor elements 10 of the elevating device to be thereby transferred toward the top of the machine and into a delivery chute C to be presently referred to.

Referring more particularly to the novel structural features of the elevating unit A it will be observed from the drawings that the same essentially comprises a pair of endless elevators or conveyor belts 10 which are mounted in converging planes to provide a substantially V-shaped trough, the bottom of which however, is left open to assist in the disposition of earthy matter or root parts that may cling to the beet roots. The said conveyor or elevator belts 10 preferably consist of a plurality of spaced bars 11 or their equivalent carried upon the sprocket chains 12 which engage over the paired sprockets 13—13 at the lower end of the unit and the similarly arranged sprockets 14 at the upper end of the unit, while the lower edge of each belt may be guided by the members 11$^a$ to prevent spreading. These sprockets are respectively mounted on the shafts 13$^a$ and 14$^a$ whose intermediate portions may be connected by a suitable longitudinal brace 15, shown in Figure 2 of the drawings. The opposite ends of shafts 13 may be supported in journal arms 13$^b$ carried by the plow shares and the braces 16 at the rear end of the inner frame. By reason of the open formation of the endless conveyor belts, and their special arrangement and disposition with reference to each other it will be apparent that while they rotate or travel together they efficiently perform the functions of a sieve or sifter for removing foreign matter from the beet roots, said action being assisted by the relative movement of the conveyor belts in their normal operation.

Any suitable and convenient means may be utilized for operating the conveyor belts 10—10 in proper synchronism with the movement of the vehicle. However, a convenient and practical means for effecting the movement of the belts is shown by the drawings, wherefrom it will be observed that the axle shaft 3 which performs the function of a driving shaft, has mounted thereon adjacent the traction wheels 4, the relatively large driving sprockets 17. Each of these sprockets is adapted to be engaged by an endless sprocket chain 18 that passes over the idlers 19 and 20 properly spaced on the rear end of the inner frame 6, and also passes over the combined transmission gear-and-sprocket driving unit 21 carried by a shaft 22 at the rear end of the inner frame 1. The connections described are of course duplicated for each of the conveyor belts 10 and therefore serve to drive both the said belts in unison to effect the transferring of the beet roots from the digging unit D to the delivery chute C.

The said chute C is preferably of the formation shown in Figure 1 of the drawings and has its relatively wide end 23 arranged beneath the discharge end of the belts 10 for the purpose of receiving the beet roots as they are ejected from the elevating device A. The delivery end of the said chute C is relatively constricted as shown in the drawings to thereby assist in guiding the beets properly into a receptacle or dropping the same in the furrow behind the machine. In connection with the delivery chute C it will be observed that the same is preferably of a mobile character. That is to say, the chute is mounted on an arcuate track 25 carried by the rear end of the inner frame, whereby its delivery end 24 may be shifted from one side to the other to deliver the beets at any desired point.

From the foregoing it will be apparent that the present device aims to provide an adjustable inner frame carrying a novel beet elevating and cleaning device which removes the beets in a thoroughly satisfactory manner from the plow shares and delivers them into a distributing chute for the purpose of facilitating their handling after the digging operation. The arrangement proposed not only prevents damage and injury to the beet roots but at the same time saves considerable manual labor and expense incident to the initial preparation of the beet roots for the market.

Without further description it is thought that the many features and advantages of the invention will be readily apparent and it will of course be understood that changes in the form, proportion, and minor details of construction may be resorted to without departing from the spirit of the invention or scope of the appended claims.

I claim:

1. In a beet harvesting machine, the combination with the digging elements, of a conveyer frame having its lower end carried by the digging elements and its upper end supported in the frame of the machine, said conveyer frame consisting of a pair of sprocket shafts arranged in vertically converging relation and journaled in the digging elements, a second pair of vertically converging sprocket shafts journaled at one end in a frame part of the machine, longitudinal braces connecting corresponding shafts of the opposite pairs of sprocket shafts, sprocket wheels carried by the sprocket shafts, conveyer belts carried by the sprocket wheels to provide a vertically converging conveyer trough, and members for guiding the lower edge portions of the inner flights of the opposite conveyer belts.

2. In a beet harvesting machine, the combination with the digging elements, of an elevating conveyer having vertically converging conveyer belts each including a pair of sprocket chains connected by transverse bars, shafts carrying sprockets for the chains and journaled in the digging elements, and a device for transmitting motion to the conveyer belts including shafts carrying sprockets over which the chain portions of the conveyer belts pass at the upper end of the conveyer, and said device also including a frame carrying sprocket wheels and chains taking over said sprocket wheels, driving sprockets carried by an axle of the machine and engaging with said chains, and an operative connection between said chains and the sprocket carrying shafts which support the upper end of the conveyer belts.

In testimony whereof I hereunto affix my signature in the presence of two witnesses.

OLE HANSEN.

Witnesses:
WARDEN JONES,
D. B. BALLANTYNE.